United States Patent
Inoue

(10) Patent No.: US 10,487,758 B2
(45) Date of Patent: Nov. 26, 2019

(54) UREA SOLUTION SPRAY NOZZLE

(71) Applicants: YANMAR CO., LTD., Osaka-shi, Osaka (JP); JAPAN SHIP MACHINERY & EQUIPMENT ASSOCIATION, Minato-ku, Tokyo (JP)

(72) Inventor: Tsuyoshi Inoue, Osaka (JP)

(73) Assignee: YANMAR CO., LTD., Osaka (JP)

(*) Notice: Subject to any disclaimer, the term of this patent is extended or adjusted under 35 U.S.C. 154(b) by 370 days.

(21) Appl. No.: 14/895,325

(22) PCT Filed: May 29, 2014

(86) PCT No.: PCT/JP2014/064321
§ 371 (c)(1),
(2) Date: Dec. 2, 2015

(87) PCT Pub. No.: WO2014/196456
PCT Pub. Date: Dec. 11, 2014

(65) Prior Publication Data
US 2016/0108838 A1 Apr. 21, 2016

(30) Foreign Application Priority Data
Jun. 4, 2013 (JP) .................. 2013-118011

(51) Int. Cl.
*F02D 41/02* (2006.01)
*F01N 3/20* (2006.01)
(Continued)

(52) U.S. Cl.
CPC ........ *F02D 41/0235* (2013.01); *B05B 7/0416* (2013.01); *B05B 7/0815* (2013.01);
(Continued)

(58) Field of Classification Search
CPC . B05B 7/0416; B05B 7/0815; F01N 2510/00; F01N 2590/02; F01N 2610/02;
(Continued)

(56) References Cited

U.S. PATENT DOCUMENTS 3,790,086 A * 2/1974 Masai .................. B05B 7/0416
239/406
4,036,434 A * 7/1977 Anderson ............... B05B 7/066
239/112
(Continued)

FOREIGN PATENT DOCUMENTS

DE 19963394 A1 7/2001
JP H09310660 12/1997
(Continued)

OTHER PUBLICATIONS

International Search Report corresponding to Application No. PCT/JP2014/064321; dated Jul. 29, 2014, with English translation.

*Primary Examiner* — Carl C Staubach
(74) *Attorney, Agent, or Firm* — Norton Rose Fulbright US LLP

(57) ABSTRACT

A urea solution spray nozzle maybe provided that can suppress the deposit and growth of urea in the urea solution spray nozzle. A urea solution spray nozzle according to at least one present embodiment is such that urea solution flow paths and gas flow paths and are constituted, and urea solution and gas are mixed and injected from an injection port, and a slit, which is a lateral ejection port, is constituted in such a manner that the gas is ejected in the same direction as the injection direction of the urea solution along surfaces of the urea solution spray nozzle, and a water-repellent coating layer is formed on the surfaces of the urea solution spray nozzle.

18 Claims, 4 Drawing Sheets

(51) Int. Cl.
*B05B 7/04* (2006.01)
*B05B 7/08* (2006.01)
*F01N 3/22* (2006.01)
*F01N 9/00* (2006.01)

(52) U.S. Cl.
CPC ............ *F01N 3/206* (2013.01); *F01N 3/208* (2013.01); *F01N 3/2066* (2013.01); *F01N 3/22* (2013.01); *F01N 9/00* (2013.01); F01N 2510/00 (2013.01); F01N 2590/02 (2013.01); F01N 2610/02 (2013.01); F01N 2610/08 (2013.01); F01N 2610/085 (2013.01); F01N 2610/146 (2013.01); F01N 2610/1453 (2013.01); F01N 2900/06 (2013.01); F01N 2900/10 (2013.01); *Y02T 10/24* (2013.01); *Y02T 10/47* (2013.01)

(58) Field of Classification Search
CPC ........... F01N 2610/08; F01N 2610/085; F01N 2610/1453; F01N 2610/146; F01N 2900/06; F01N 2900/10; F01N 3/206; F01N 3/2066
See application file for complete search history.

(56) References Cited

U.S. PATENT DOCUMENTS

| | | | | |
|---|---|---|---|---|
| 4,080,099 | A * | 3/1978 | Snyder | B63H 1/26 416/146 R |
| 4,241,656 | A * | 12/1980 | Smith | B05B 7/0475 101/148 |
| 4,473,185 | A * | 9/1984 | Peterson | B05B 7/0416 239/405 |
| 6,848,251 | B2 * | 2/2005 | Ripper | B01D 53/56 60/274 |
| 8,590,812 | B2 * | 11/2013 | Wurz | F23D 11/102 239/419 |
| 9,279,355 | B2 * | 3/2016 | Inoue | F01N 3/2896 |
| 2003/0209613 | A1 * | 11/2003 | Miyauchi | B05B 7/02 239/418 |
| 2004/0101450 | A1 * | 5/2004 | Mayer | B01D 53/90 422/172 |
| 2005/0284957 | A1 * | 12/2005 | Haruch | B05B 7/066 239/290 |
| 2007/0102539 | A1 * | 5/2007 | Riney | B05B 7/0807 239/296 |
| 2007/0200007 | A1 * | 8/2007 | Stevens | B01J 2/16 239/7 |
| 2008/0236147 | A1 * | 10/2008 | Van Vuuren | F01N 3/2066 60/295 |
| 2010/0163647 | A1 * | 7/2010 | Wurz | B05B 7/0458 239/399 |
| 2010/0219268 | A1 * | 9/2010 | Wurz | B05B 1/3405 239/590.5 |
| 2011/0056185 | A1 * | 3/2011 | Bradley | F01N 3/00 60/274 |
| 2012/0174561 | A1 * | 7/2012 | Troxler | F01N 3/2066 60/274 |
| 2012/0198794 | A1 * | 8/2012 | Turpin | F01N 1/00 53/452 |
| 2013/0261874 | A1 * | 10/2013 | McQuade | F02D 29/02 701/29.1 |
| 2014/0034014 | A1 * | 2/2014 | Blythe | F02D 41/1497 123/435 |
| 2014/0034170 | A1 * | 2/2014 | Diouf | F01N 3/2066 137/798 |
| 2015/0167524 | A1 * | 6/2015 | Inoue | F01N 3/2066 60/295 |
| 2016/0143790 | A1 * | 5/2016 | Umemoto | A61F 13/534 604/372 |

FOREIGN PATENT DOCUMENTS

| | | | | |
|---|---|---|---|---|
| JP | 2003083055 | A | 3/2003 | |
| JP | 2008019773 | A | 1/2008 | |
| JP | 2009041502 | A | 2/2009 | |
| JP | 2011080437 | A | 4/2011 | |
| JP | 2011080437 | A2 * | 4/2011 | ............... F01N 3/08 |
| WO | 2013191134 | A1 | 12/2013 | |

* cited by examiner

UREA SOLUTION SPRAY NOZZLE

CROSS REFERENCE TO RELATED APPLICATIONS

This is the U.S. national stage of application No. PCT/JP2014/064321, filed on May 29, 2014. Priority under 35 U.S.C. § 119(a) and 35 U.S.C. § 365(b) is claimed from Japanese Application No. 2013-118011, filed Jun. 4, 2013, the disclosure of which is also incorporated herein by reference.

TECHNICAL FIELD

The present invention relates to a urea solution spray nozzle and more particularly relates to a urea solution spray nozzle in an exhaust purification device for vessels.

BACKGROUND ART

Conventionally, there have been known exhaust purification devices in which the NOx catalyst (DCR catalyst) of a selective catalytic reduction type is arranged in the interior of an exhaust pipe, and NOx is reduced to nitrogen and water by use of ammonia as a reducing agent, in order to reduce NOx (nitride oxide) included in exhaust discharged from an internal combustion engine. The urea solution is supplied from a urea solution spray nozzle arranged in the interior of the exhaust pipe into the exhaust, and ammonia is generated from the urea solution by heat of the exhaust, thereby reducing NOx to nitrogen and water.

In the aforementioned exhaust purification device, there is a problem in that the water content of the urea solution remained on the surface of the urea solution spray nozzle evaporates due to the heat of the exhaust, and urea is deposited and grown, which blocks the exhaust pipe. Accordingly, there have been known devices in which a water-repellent coating layer is formed at the tip end of the urea solution spray nozzle, which makes it hard for the urea solution to adhere to the surface of the urea solution spray nozzle. For example, Patent Literature 1 discloses the above-mentioned nozzle.

However, the nozzle disclosed in Patent Literature 1 does not remove the urea solution from the tip end of the nozzle in a positive manner. Accordingly, there is a disadvantage that the urea solution remains on the surface of the nozzle due to a certain direction of the nozzle or a certain shape of the nozzle, and the deposit and growth of the urea cannot be efficiently prevented.

CITATION LIST

Patent Literature

PTL 1: Japanese Unexamined Patent Application Publication No. 2009-41502

SUMMARY OF INVENTION

Technical Problem

The present invention has been achieved to solve the above-mentioned problems. It is an object of the present invention to provide a urea solution spray nozzle that can suppress the deposit and growth of urea in the urea solution spray nozzle.

Solution to Problem

The problems solved by the present invention have been described above. Subsequently, the means of solving the problems will be described below.

That is, in the present invention, a urea solution spray nozzle, in which a urea solution flow path and a gas flow path are constituted, and urea solution and gas are mixed and injected from an injection port, is such that a lateral ejection port is constituted in such a manner that the gas is ejected in a same direction as an injection direction of the urea solution along a surface of the urea solution spray nozzle, and a water-repellent coating layer is formed on the surface of the urea solution spray nozzle.

That is, in the present invention, it is formed in such a manner that a distance from a flow path, in which the gas and the urea solution are mixed, to the surface is reduced as being in close proximity to the injection port, and an outline of the urea solution spray nozzle in a side view in a predetermined range from the injection port is configured to form a constant angle with respect to the injection direction of the urea solution.

That is, in the present invention, the water-repellent coating layer is a ceramic coating layer.

Advantageous Effects of Invention

As the effects of the present invention, the following advantageous effects are provided.

According to the present invention of the instant application, the urea solution adhered to the lateral surface of the urea solution spray nozzle is easily eliminated by use of the water-repellent effect of the tip end of the nozzle and the ejection force of the gas discharged along the surfaces of the nozzle. Accordingly, the deposit and growth of the urea in the urea solution spray nozzle can be suppressed.

According to the present invention of the instant application, the inclined plane in the vicinity of the injection port of the urea solution spray nozzle is formed, so that the urea solution adhered to the vicinity of the injection port is easily eliminated. Accordingly, the deposit and growth of the urea in the urea solution spray nozzle can be suppressed.

According to the present invention of the instant application, even when the urea solution spray nozzle is arranged in the high-temperature exhaust, the water-repellent effect can be maintained. Accordingly, the deposit and growth of the urea in the urea solution spray nozzle can be suppressed.

DESCRIPTION OF EMBODIMENTS

Figure 1:
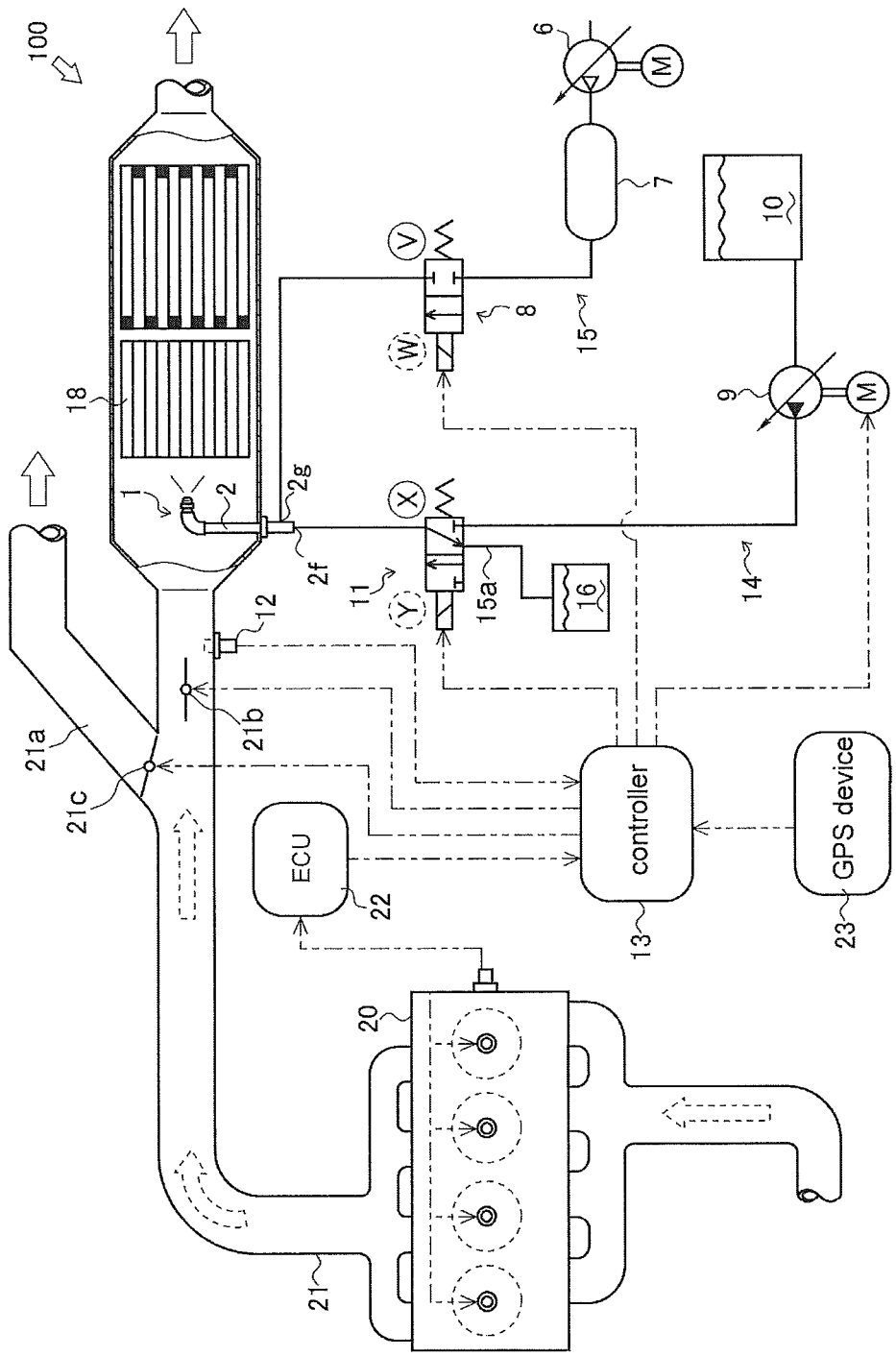
FIG. 1 is a view illustrating the constitution of an exhaust purification device according to an embodiment of the present embodiment.

Hereinafter, an exhaust purification device 100 of a marine engine according to an embodiment of the present invention will be described referring to the FIGS. 1 and 2. It is noted that, in the present embodiment, "upstream side" represents the upstream side of the flow direction of a fluid, and "downstream side" represents the downstream side of the flow direction of the fluid. The present embodiment is configured such that the exhaust purification device 100 is provided with respect to one engine (for example, a main engine or auxiliaries for a marine engine), but not limited to this. When a plurality of engines (for example, auxiliaries for the marine engine) are arranged, it may be configured that one exhaust purification device purifies the exhaust from the plurality of engines en masse, or that the exhaust purification device is provided for each engine.

Firstly, the exhaust pipe 21 of an engine 20 will be described. As illustrated in FIG. 1, the exhaust pipe 21 discharges the exhaust from the engine 20 to the outside (atmosphere). The exhaust purification device 100 is provided in the exhaust pipe 21. Also, in the exhaust pipe 21, a branch pipe 21a and exhaust switching valves 21b and 21c for switching the pass routes of the exhaust are provided on the upstream side of the exhaust purification device 100. The branch pipe 21a is connected to the exhaust pipe 21. The exhaust switching valve 21b is arranged in the upstream side of the exhaust purification device 100 and in the interior of the exhaust pipe 21 on the downstream side of the branch pipe 21a. The exhaust switching valve 21c is arranged in the interior of the branch pipe 21a.

The exhaust switching valves 21b and 21c are configured to operate together with each other in an openable/closable manner. Specifically, the exhaust switching valves 21b and 21c are configured such that when the exhaust switching valve 21b is in an open state, the exhaust switching valve 21c is brought in a closed state, whereas when the exhaust switching valve 21b is in a closed state, the exhaust switching valve 21c is brought in an open state. Accordingly, when the exhaust switching valves 21b is in an open state, and the exhaust switching valve 21c is in a closed state, a path through which the exhaust is supplied to the exhaust purification device 100 is constituted in the exhaust pipe 21 (state in FIG. 1). In contrast, when the exhaust switching valve 21b is in a closed state, and the exhaust switching valve 21c is in an open state, a path through which the exhaust is not purified with the exhaust purification device 100 but discharged through the branch pipe 21a to the outside (atmosphere) is constituted in the exhaust pipe 21.

Also, as another embodiment, it may be configured that an exhaust switching valve for selectively bringing any one of the exhaust pipe 21 and the branch pipe 21a into a closed state is provided at the connection portion of the branch pipe 21a. When the branch pipe 21a is in a closed state, the path through which the exhaust is supplied to the exhaust purification device 100 is constituted in the exhaust pipe 21. In contrast, when the exhaust pipe 21 is in a closed state, the path through which the exhaust is not purified with the exhaust purification device 100 but discharged through the branch pipe 21a to the outside (atmosphere) is constituted in the exhaust pipe 21.

Next, the exhaust purification device 100 will be described. The exhaust purification device 100 purifies the exhaust from the engine 20. The exhaust purification device 100 includes a urea solution spray nozzle 1, a pressurized air supply pump (compressor) 6, a pressurized air valve 8, a urea solution supply pump 9, a switching valve 11, an NOx detection unit 12, control device 13, a first supply flow path 14, a second supply flow path 15, an NOx catalyst 18, and the like.

The urea solution spray nozzle 1 supplies the urea solution to the interior of the exhaust pipe 21. The urea solution spray nozzle 1 is provided on the downstream side of the exhaust switching valve 21b in the exhaust pipe 21. The urea solution spray nozzle 1 is constituted of a tubular member and provided in such a manner that the one side thereof (downstream side) is inserted from the exterior to the interior of the exhaust pipe 21. The urea solution spray nozzle 1 includes a double pipe 2, a liquid nozzle 3, an air nozzle 4, a nut 5, and the like (see FIG. 2).

The pressurized air supply pump (compressor) 6 supplies pressurized air to an air tank 7. The pressurized air supply pump 6 pressurizes (compresses) the air and supplies the pressurized air. When the pressure of the air tank 7 falls below predetermined pressure, the pressurized air supply pump 6 supplies the air to the air tank 7, and when the pressure of the air tank 7 reaches predetermined pressure, the pressurized air supply pump 6 stops.

The pressurized air valve 8 communicates with or blocks a flow path for the pressurized air. The pressurized air valve 8 is provided in the second supply flow path 15. The pressurized air valve 8 slides a spool, thereby switching a position V and a position W. Regarding the pressurized air valve 8, when the spool is in a state of being at the position V, the second supply flow path 15 is blocked. Accordingly, the pressurized air is not supplied to the urea solution spray nozzle 1. Regarding the pressurized air valve 8, when the spool is in a state of being at the position W, the second supply flow path 15 is communicated. Accordingly, the pressurized air is supplied to the urea solution spray nozzle 1.

The urea solution supply pump 9 supplies the urea solution to the urea solution spray nozzle 1. The urea solution supply pump 9 is provided in the first supply flow path 14. The urea solution supply pump 9 supplies the urea solution in a urea solution tank 10 to the urea solution spray nozzle 1 at a predetermined flow rate via the first supply flow path 14.

The switching valve 11 switches the flow paths of the urea solution. The switching valve 11 is provided on the downstream side of the urea solution supply pump 9 of the first supply flow path 14. A drain pot 16 is connected to the switching valve 11 via a flow path 15a. The switching valve 11 slides a spool, thereby switching a position X and a position Y. Regarding the switching valve 11, when the spool is in a state of being at the position X, the first supply flow path 14 is blocked, and the urea solution spray nozzle 1 and the drain pot 16 are communicated. Regarding the switching valve 11, when the spool is in a state of being at the position Y, the first supply flow path 14 is communicated. Accordingly, the urea solution is supplied to the urea solution spray nozzle 1.

The NOx detection unit 12 detects NOx emission included in the exhaust of the engine 20. The NOx detection unit 12 is constituted of an NOx sensor and the like and arranged at a midway portion of the exhaust pipe 21 and on the upstream side with respect to the NOx catalyst 18.

The control device 13 controls the urea solution supply pump 9, the switching valve 11, the pressurized air valve 8, the exhaust switching valves 21b and 21c, and the like. Various programs, data, and an exhaust regulation area map M1 for controlling the urea solution supply pump 9, the switching valve 11, the pressurized air valve 8, the exhaust switching valves 21b and 21c, and the like are stored in the control device 13. The control device 13 may be configured such that a CPU, a ROM, a RAM, a HDD, and the like are connected via a bus or may be configured to be made up of one-chip LDI and the like. Also, the control device 13 may be integrally configured with an ECU 22 for controlling the engine 20.

The control device 13 is connected to the ECU 22, the pressurized air valve 8, the urea solution supply pump 9, the switching valve 11, and the exhaust switching valves 21b and 21c respectively. Also, the control device 13 is connected to a GPS (global positioning system) device 23.

The control device 13 can obtain various pieces of information on the engine 20 from the ECU 22 respectively. The control device 13 is connected to the NOx detection unit 12 and can obtain the NOx emission detected by the NOx detection unit 12. The control device 13 is connected to the GPS (global positioning system) device 23 and can obtain a present position of the exhaust purification device 100, which is detected by the GPS device 23. Also, the control device 13 can control the pressurized air valve 8, the urea solution supply pump 9, the switching valve 11, and the exhaust switching valves 21b and 21c respectively.

The NOx catalyst 18 facilitates the reduction reaction of NOx. The NOx catalyst 18 is arranged in the interior of the exhaust pipe 21 and on the downstream side with respect to the urea solution spray nozzle 1. The NOx catalyst 18 facilitates reaction in which NOx included in the exhaust is reduced to nitrogen and water with ammonia generated by pyrolyzing and hydrolyzing the urea solution.

Regarding the exhaust purification device 100 constituted in the aforementioned manner, for example, when the exhaust purification device 100 is mounted on a vessel, the control device 13 obtains a present position detected by the GPS device 23 and determines whether or not the present position is in an exhaust regulation area based on the exhaust regulation area map M1. When the control device 13 determines that the present position is in the exhaust regulation area, the control device 13 controls the exhaust switching valve 21b to be in an open state, and controls the exhaust switching valve 21c to be in a closed state. That is, after being purified by the exhaust purification device 100, the exhaust is discharged to the outside. When the control device 13 determines that the present position is not in the exhaust regulation area, the control device 13 controls the exhaust switching valve 21b to be in a closed state, and controls the exhaust switching valve 21c to be in an open state. That is, the exhaust is not purified by the exhaust purification device but discharged to the outside through the branch pipe 21a. It is noted that the control device 13 can obtain an open/close signal of the exhaust switching valves 21b and 21c by manual operation and control the exhaust switching valves 21b and 21c in accordance with the open/close signal.

Figure 2:
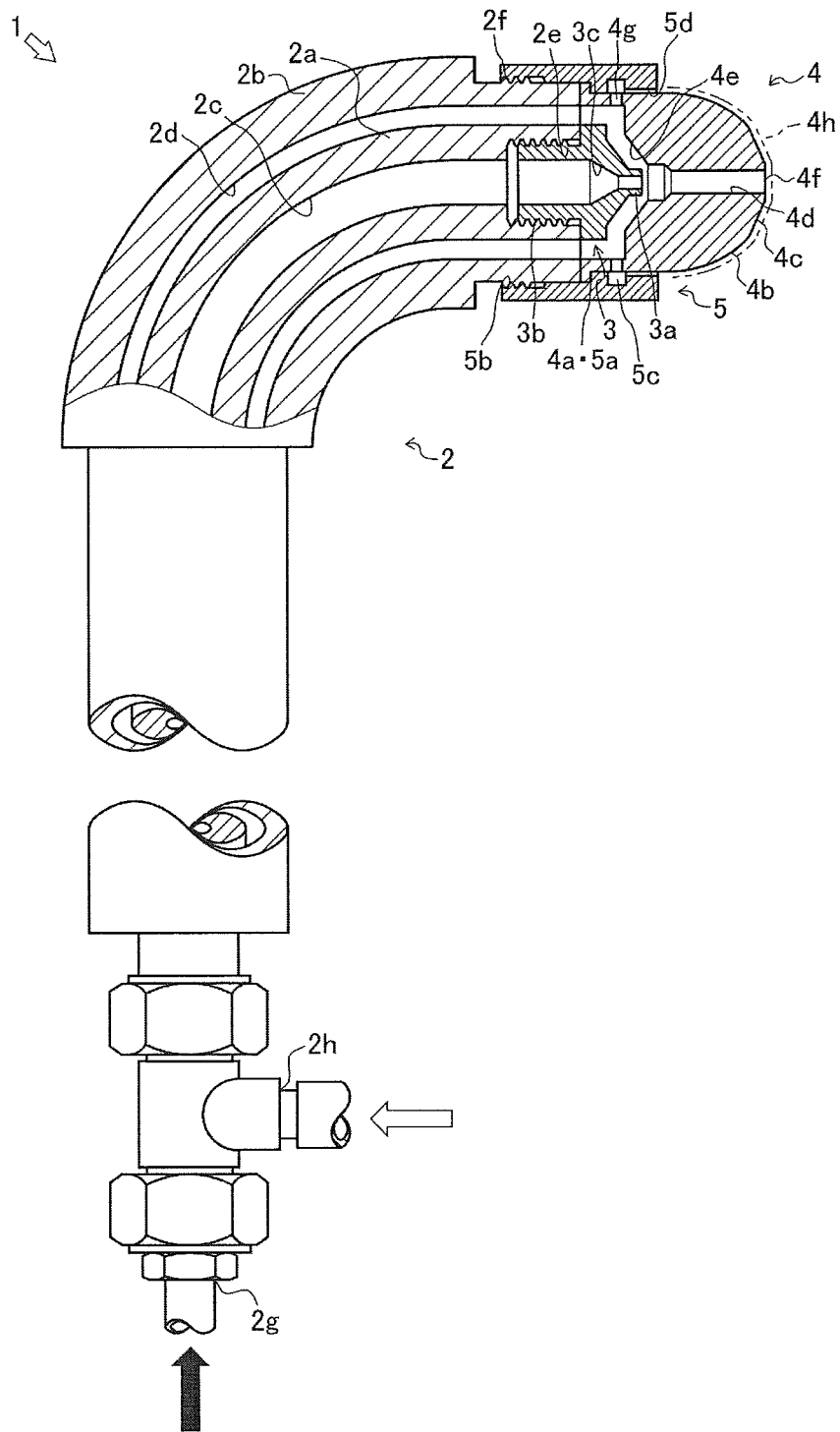
FIG. 2 is a partial cross-sectional view illustrating a urea solution spray nozzle of the exhaust purification device according to the embodiment of the present embodiment.
Figure 3A:
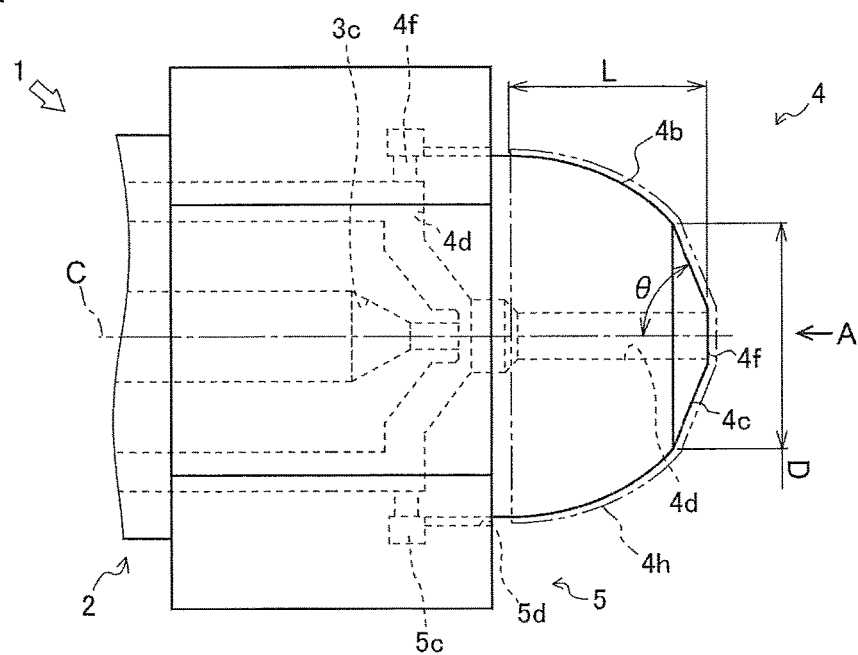
FIG. 3A is a lateral enlarged view illustrating a tip end of the urea solution spray nozzle in FIG. 2.
Figure 3B:
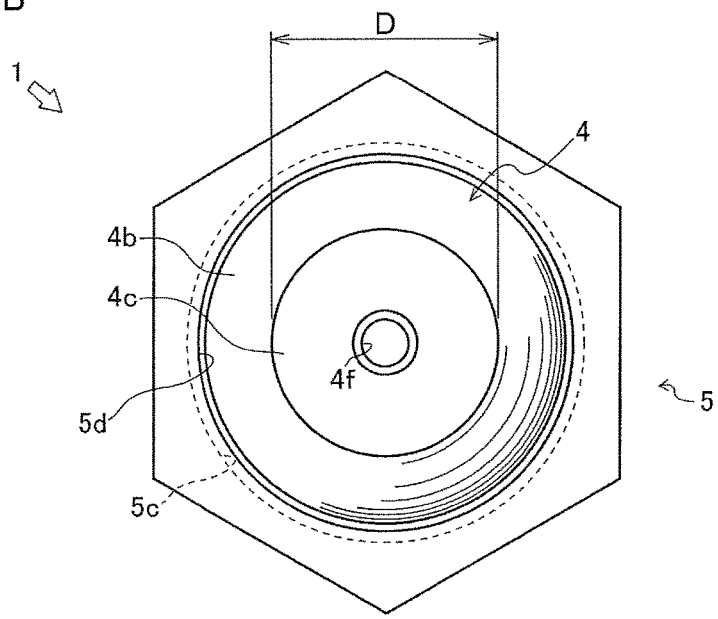
FIG. 3B is an A arrow view of the urea solution spray nozzle in FIG. 3A.

Next, the urea solution spray nozzle 1 of an intermixing type will be specifically described referring to FIGS. 2 and 3A-3B. It is noted that the type of the urea solution spray nozzle 1 is not limited to the present embodiment but the urea solution spray nozzle 1 of a non-premixing type may be employed.

As illustrated in FIG. 2, the urea solution spray nozzle 1 includes the double pipe 2, the liquid nozzle 3, the air nozzle 4, and the nut 5.

The double pipe 2 is a main constituent member of the urea solution spray nozzle 1 and constitutes a path of the urea solution and a path of the pressurized air. The double pipe 2 is arranged in such a manner that the downstream side thereof is positioned in the interior of the exhaust pipe 21, and the upstream side thereof is positioned in the exterior of the exhaust pipe 21. The end portion on the downstream side of the double pipe 2 is arranged on the upstream side of the NOx catalyst 18 arranged in the interior of the exhaust pipe 21.

The double pipe 2 is constituted of an outer pipe 2b and an inner pipe 2a arranged in the interior of the outer pipe 2b. A urea solution flow path 2c, which is a flow path of the urea solution, is constituted in the inner pipe 2a. A gas flow path 2d, which is a flow path of the pressurized air, is constituted in a gap between the inner pipe 2a and the outer pipe 2b. A connection portion not illustrated but connectible with the exhaust pipe 21 in a watertight manner is constituted in a midway portion on the outer side of the outer pipe 2b. A female screw portion 2e and a male screw portion 2f are formed at an end portion on the downstream side of the inner pipe 2a and at an end portion on the downstream side of the outer pipe 2b. A urea solution supply port 2g communicated with the urea solution flow path 2c and a gas supply port 2h communicated with the gas flow path 2d are constituted at an end portion on the upstream side of the double pipe 2.

The liquid nozzle 3 injects the urea solution. The liquid nozzle 3 is formed of an approximately cylindrical member and arranged on the downstream side of the double pipe 2. The end portion on the downstream side of the liquid nozzle 3 is formed in an approximately conical shape centering on the shaft center portion thereof. An approximately cylindrical convex portion 3a is formed in such a manner as to protrude in the axial direction at the center portion of the end portion on the downstream side. A male screw portion 3b is formed in such a manner as to protrude in the axial direction at the end portion on the upstream side of the liquid nozzle 3. Furthermore, in the shaft center portion of the liquid nozzle 3, a urea solution flow path 3c is formed from the male screw portion 3b to the convex portion 3a in such a manner as to penetrate the whole of the liquid nozzle 3 in the axial direction. The urea solution flow path 3c is reduced in diameter at the midway portion with respect to the downstream side and formed in such a manner that the inner diameter of the end portion on the downstream side of the urea solution flow path 3c is made smaller than the inner diameter of the end portion on the upstream side of the urea solution flow path 3c.

Regarding the liquid nozzle 3, the male screw portion 3b is threadedly engaged with the female screw portion 2e of the double pipe 2. Accordingly, the double pipe 2 and the liquid nozzle 3 are connected, and the urea solution flow path 3c and the urea solution flow path 2c of the double pipe 2 are communicated. Thus, the urea solution is configured to be supplied from the urea solution flow path 2c of the double pipe 2 to the urea solution flow path 3c.

The air nozzle 4 injects the atomized urea solution. The air nozzle 4 is formed of an approximately cylindrical member. The air nozzle 4 is arranged on the downstream side of the liquid nozzle 3 in such a manner that an upstream-side end thereof is abutted to the end portion of the double pipe 2 on the downstream side. In the shaft center portion of the air nozzle 4, a hole that includes an approximately conical reduced-diameter portion, whose diameter is reduced from the midway portion to the downstream side, is formed in such a manner as to penetrate the air nozzle 4 from the upstream-side end to the downstream-side end thereof. The end portion of the hole on the upstream side is formed in such a manner as to have an inner diameter to the extent that even when the end portion of the liquid nozzle 3 on the downstream side is inserted, a space through which the compressed air can pass is constituted. A mixing flow path 4d of the urea solution is formed at the shaft center portion of the reduced-diameter-side end of the reduced-diameter portion. Then, an injection port 4f, which is an opening portion of the mixing flow path 4d, is formed at the end portion of the air nozzle 4 on the downstream side.

A flange portion 4a is formed on the lateral surface of the end portion on the upstream side of the air nozzle 4. The downstream side of the air nozzle 4 is formed in an approximately shell shape in which the injection port 4f is positioned as an apex. Specifically, as illustrated in FIG. 3A, on the lateral surface (surface) on the downstream side of the air nozzle 4, a surface 4b made up of a curved surface, on which a distance from the mixing flow path 4d is reduced as being in close proximity to the injection port 4f, is formed in a predetermined range L in a side view (in the lateral direction of an axial line C of the air nozzle 4) from the injection port 4f. Furthermore, regarding the air nozzle 4, a surface 4c is formed in a predetermined range D centering on the injection port 4f in a front view (in the direction of the axial line C of the air nozzle 4). The surface 4c is formed in such a manner that the outline in the predetermined range D in a side view of the air nozzle 4 forms a constant angle θ with respect to the axial line C. That is, the downstream side of the air nozzle 4 is formed in an approximately truncated cone, centering on the injection port 4f. Accordingly, the air nozzle 4 has an inclined plane that is contiguous to the injection port 4f and has a constant tilted angle θ in such a manner as to surround the injection port 4f.

A water-repellent coating layer 4h is formed on the surface 4b and the surface 4c of the air nozzle 4. The water-repellent coating layer 4h suppresses the adhesion of the urea solution, which is liquid. The water-repellent coating layer 4h is constituted of a ceramic coating layer that can be used in the exhaust having a temperature approximately ranging from 300 to 350 Celsius degrees. The exhaust temperature substantially varies depending on a state of load of the engine 20. Accordingly, regarding the water-repellent coating layer 4h, a ceramic coating layer is suitable that has higher thermal resistance than that of fluorine coating, which is general thermal resistant coating whose thermal resistant temperature is approximately 250 Celsius degrees. Accordingly, the air nozzle 4 can easily remove the urea solution from the surface thereof.

As illustrated in FIG. 2, the air nozzle 4 is connected to the double pipe 2 by means of the nut 5. The end portion on the downstream side of the liquid nozzle 3 is inserted into the hole on the upstream side of the air nozzle 4. In this time, a gap is formed between the hole of the air nozzle 4 and the liquid nozzle 3. The gap is constituted as a gas flow path 4e in such a manner as to communicate with the gas flow path 2d and the mixing flow path 4d of the double pipe 2. Thus, the urea solution is supplied from the urea solution flow path 3c of the liquid nozzle 3 to the mixing flow path 4d, and the pressurized air is supplied from the gas flow path 4e to the mixing flow path 4d. That is, the air nozzle 4 is threadedly engaged with the double pipe 2, so that it is constituted that the urea solution can be injected from the injection port 4f.

One or more branch flow paths 4g are formed in the air nozzle 4 in such a manner as to communicate with the hole of the air nozzle 4 from the lateral surface thereof. That is, the branch flow paths 4g are formed in such a manner as to communicate from the lateral surface of the air nozzle 4 to the gas flow path 4e. When the pressurized air is supplied to the gas flow path 4e, part of the pressurized air is discharged to the lateral surface of the air nozzle 4 via the branch flow paths 4g. Regarding the branch flow paths 4g, the number of branch flow paths 4g or the inner diameter of the flow path is determined in accordance with the amount of pressurized air discharged to the lateral surface of the air nozzle 4.

The double pipe 2 and the air nozzle 4 are fastened with the nut 5. A stepped portion 5a engaged with the flange portion 4a of the air nozzle 4 is formed in the inner diameter of the nut 5. A female screw portion 5b that is threadedly engaged with the male screw portion 2f of the double pipe 2 is formed on the upstream side of the stepped portion 5a. The downstream side of the stepped portion 5a is formed in such a manner as to have an inner diameter to the extent that the air nozzle 4 can be inserted without a gap. Also, an expanded-diameter portion is formed on the downstream side of the stepped portion 5a and at a section facing the branch flow path 4g of the air nozzle 4. The downstream side of the expanded-diameter portion is formed in such a manner as to have an inner diameter that is slightly larger than the outer diameter of the air nozzle 4.

The nut 5 is fixed such that the stepped portion 5a is engaged with the flange portion 4a of the air nozzle 4, and that the female screw portion 5b is threadedly engaged with the male screw portion 2f of the double pipe 2. Accordingly, the end portion on the upstream side of the air nozzle 4 is abutted and fixed on the end portion on the downstream side of the double pipe 2. In this time, a space 5c, in which gas from the expanded-diameter portion of the nut 5 and the lateral surface of the air nozzle 4 stays, is constituted. Consequently, the space 5c is constituted in such a manner that the pressurized air can be supplied via the branch flow paths 4g of the air nozzle 4.

As illustrated in FIGS. 2 and 3A-3B, a slit 5d is constituted between the air nozzle 4 and the nut 5 on the downstream side with respect to the space 5c. That is, the slit 5d is constituted along the lateral surface in such a manner as to surround the air nozzle 4. Furthermore, the slit 5d is communicated with the space 5c. That is, the pressurized air supplied to the space 5c is constituted such that the pressurized air can be discharged to the downstream side of the space 5c, which is disposed in the same direction as the injection direction of the urea solution, from the slit 5d along the lateral surface of the air nozzle 4. In this manner, the slit 5d, which is a lateral ejection port from which the pressurized air is discharged, is constituted on the lateral surface of the air nozzle 4.

As described above, the urea solution spray nozzle 1 is configured to include the liquid nozzle 3 that injects the urea solution to the end portion on one side (downstream side) and the air nozzle 4 and inject the urea solution to the NOx catalyst 18. It is noted that, regarding the constitution of the urea solution spray nozzle 1, in the present embodiment, the urea solution flow path 3c, the gas flow path 4e, and the mixing flow path 4d are constituted of the liquid nozzle 3 and the air nozzle 4, but not particularly limited to these. The urea solution flow path 3c, the gas flow path 4e, and the mixing flow path 4d only need to be constituted respectively.

Figure 4A:
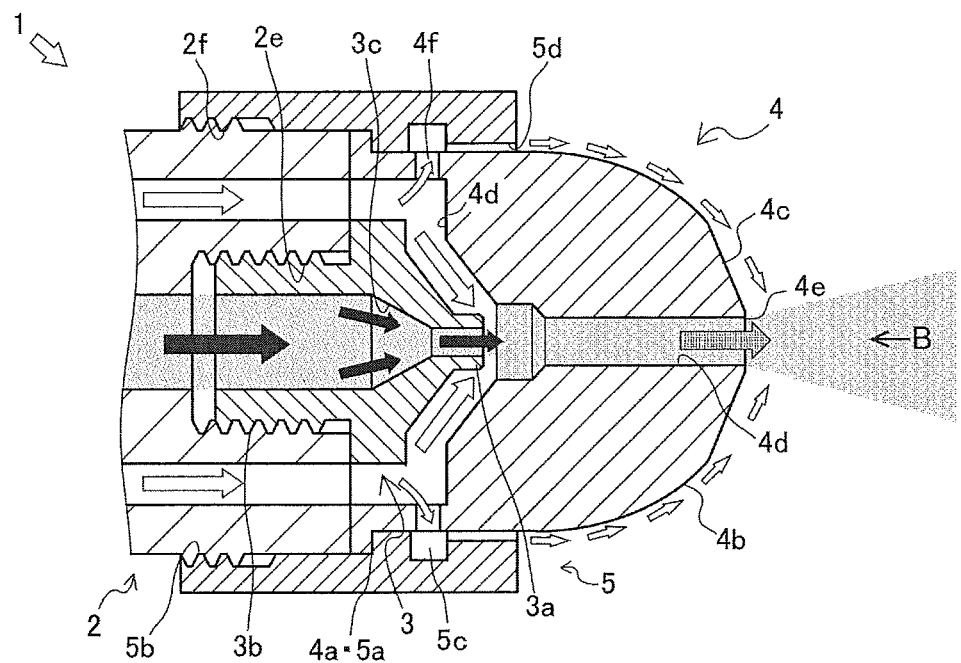
FIG. 4A is a cross-sectional view illustrating a state where urea solution is supplied from the urea solution spray nozzle of the exhaust purification device according to the embodiment of the present embodiment to the interior of an exhaust pipe.
Figure 4B:
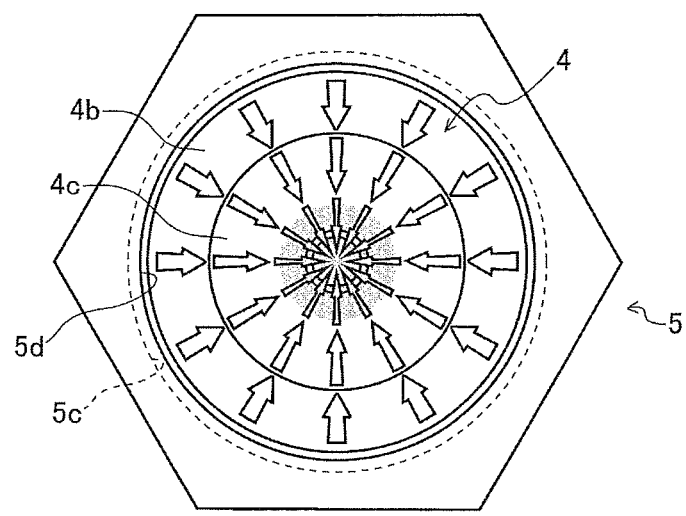
FIG. 4B is a B arrow view of the urea solution spray nozzle in FIG. 4A.

Hereinafter, the operational mode of the urea solution spray nozzle 1 will be described referring to FIGS. 1, 2, and 4.

As illustrated in FIG. 1, when the supply (injection) of the urea solution to the interior of the exhaust pipe 21 is started, the control device 13 sets the switching valve 11 to the position Y, thereby supplying the urea solution to the urea solution supply port 2g of the urea solution spray nozzle 1 (double pipe 2). As illustrated in FIGS. 2 and 4A, the urea solution, as represented in black-painted arrows in FIG. 4A, is injected under predetermined pressure from the convex portion 3a of the liquid nozzle 3 to the mixing flow path 4d of the air nozzle 4 via the urea solution flow path 2c of the double pipe 2 and the urea solution flow path 3c of the liquid nozzle 3.

In this state, as illustrated in FIG. 1, the control device 13 sets the pressurized air valve 8 to the position W, thereby supplying the pressurized air to the gas supply port 2h of the urea solution spray nozzle 1 (double pipe 2). As illustrated in FIGS. 2 and 4A, the pressurized air, as represented in void arrows in FIG. 4A, is injected under predetermined pressure to the mixing flow path 4d of the air nozzle 4 via the gas flow path 2d of the double pipe 2 and the gas flow path 4e of the air nozzle 4. As a result, the urea solution collides with the pressurized air in the interior of the mixing flow path 4d of the air nozzle 4, and the urea solution is atomized and injected from the injection port 4f of the air nozzle 4.

Part of the pressurized air supplied to the gas flow path 4e of the air nozzle 4 is supplied to the space 5c via the branch flow paths 4g. The pressurized air supplied to the space 5c is discharged under uniform pressure from the slit 5d to the downstream side (the side of the injection port 4f) of the air nozzle 4. The pressurized air discharged from the slit 5d advances in such a manner as to wrap the air nozzle 4 along the lateral surface of the air nozzle 4 owing to the viscosity of the pressurized air. The pressurized air advances on the surface of the air nozzle 4 along the surface 4b and the surface 4c, which are the lateral surfaces of the air nozzle 4 formed in a shell shape, and reaches the injection port 4f. Accordingly, even when the urea solution injected from the injection port 4f comes close to the surface 4b and the surface 4c of the air nozzle 4, the urea solution is blown away by the pressurized air. Also, the urea solution adhered to the surface 4b and the surface 4c of the air nozzle 4 is easily blown away by the pressurized air by dint of the effect of the water-repellent coating layer 4h.

As illustrated in FIG. 1, when the supply (injection) of the urea solution to the interior of the exhaust pipe 21 is stopped, the control device 13 sets the position of the switching valve 11 to the position X, thereby stopping the supply of the urea solution to the urea solution supply port 2g of the urea solution spray nozzle 1 (double pipe 2). Along with this, the urea solution supply port 2g of the double pipe 2 is opened to the atmosphere via the first supply flow path 14 and the switching valve 11. Regarding the air nozzle 4, even when the urea solution is adhered to the surface of the air nozzle 4 after stoppage of the pressurized air from the slit 5d, the urea solution flows off the surface of the air nozzle 4 owing to the effect of the water-repellent coating layer 4h formed on the surface 4b and the surface 4c, which suppresses the adhesion of the urea solution.

Also, in a case where the urea solution spray nozzle 1 is arranged in such a manner that the injection port 4f of the air nozzle 4 is directed upward, even when the urea solution is adhered to the periphery of the injection port 4f of the air nozzle 4, the urea solution flows downward owing to the inclination of the surface 4c formed in such a manner as to surround the injection port 4f, in addition to the effect of the water-repellent coating layer 4h formed on the surface 4b and the surface 4c, which suppresses the adhesion of the urea solution.

As described above, the urea solution adhered to the lateral surface (surface) of the urea solution spray nozzle 1 is easily eliminated by use of the water-repellent effect of the tip end of the air nozzle 4 and the ejection force of the pressurized air, which is the discharged gas along the surface 4b and the surface 4c of the air nozzle 4. Accordingly, the deposit and growth of the urea in the air nozzle 4 can be suppressed.

Also, the surface 4c that includes the inclined plane in the vicinity of the injection port 4f of the urea solution spray nozzle 1 is formed, so that the urea solution adhered to the vicinity of the injection port 4f is easily eliminated. Accordingly, the deposit and growth of the urea in the air nozzle 4 can be suppressed.

Also, even when the air nozzle 4 is arranged in the high-temperature exhaust, the water-repellent effect can be maintained. Accordingly, the deposit and growth of the urea in the air nozzle 4 can be suppressed.

The present invention can be applied to the technology of the urea solution spray nozzle of the exhaust purification device.

REFERENCE SIGNS LIST

1 Urea solution spray nozzle
2c Urea solution flow path
3c Urea solution flow path
2d Gas flow path
4c Surface
4d Surface
4e Gas flow path
4f Injection port
5d Slit

The invention claimed is:

1. A system for spraying a urea solution, the system comprising:
   a double pipe structure comprising a urea solution flow path and a gas flow path;
   an air nozzle defining an injection port having:
      a first opening,
      a second opening, and
      a channel extending between the first opening and the second opening of the injection port,
      wherein the air nozzle and the double pipe structure are fastened together with a nut;
   a branch flow path in fluid communication with the gas flow path and a lateral ejection port, the lateral ejection port is configured so pressurized air that passes through the branch flow path to the lateral ejection port is ejected from the lateral ejection port in a same direction as an injection direction of the urea solution and along an outer surface of the air nozzle; and
   a water-repellent coating layer on the outer surface of the air nozzle,
   wherein the outer surface of the air nozzle comprises an inclined plane in such a manner that an outline of the air nozzle is at a constant angle with respect to an axial line of the injection port in a predetermined range centering on the injection port; and
   wherein the double pipe structure is configured to provide pressurized air that passes through the gas flow path and urea solution that passes through the urea solution flow path into the first opening of the injection port such that the pressurized air mixed with urea solution is ejected from the second opening of the injection port.

2. The system of claim 1, wherein:
   the lateral ejection port is on the outer surface of the air nozzle and surrounds the air nozzle; and
   an output of the injection port is positioned farther downstream than an output of the lateral ejection port.

3. The system of claim 1, further comprising:
   a global positioning system configured to detect a position of a vessel;
   a memory configured to store regulation area map data associated with a regulation area of exhaust; and
   a controller coupled to the global positioning system and the memory, the controller configured to:

receive an indication of the position from the global positioning system; and in response to a determination that that the position corresponds to the regulation area of exhaust, control an amount of the urea solution via the urea solution flow path, an amount of pressurized air via the gas flow path, or both.

4. A system to spray a urea solution, the system comprising:
a double pipe structure configured to route the urea solution via a urea solution flow path and route pressurized air via a gas flow path;
an air nozzle coupled to the double pipe structure, the air nozzle defining:
an injection port having an axial line and configured to output a mixture of a first portion of the pressurized air and the urea solution in an injection direction; and
an outer surface that comprises an inclined plane in such a manner that an outline of the air nozzle is at a constant angle with respect to the axial line of the injection port in a predetermined range centering on the injection port;
a nut configured to couple the air nozzle and the double pipe structure;
a lateral ejection port associated with a branch flow path that is in fluid communication with the gas flow path, the lateral ejection port is configured to eject a second portion of the pressurized air from the lateral ejection port in a same direction as the injection direction and along the outer surface of the air nozzle; and
a water-repellent coating layer on the outer surface of the air nozzle.

5. The system of claim 4, wherein an output of the lateral ejection port has a ring shape.

6. The system of claim 4, wherein the injection port extends through the air nozzle.

7. The system of claim 4, wherein the injection port comprises:
an input opening portion configured to receive the mixture;
an output opening portion configured to output the mixture; and
a channel portion positioned between the input opening portion and the output opening portion, wherein the channel portion extends through the air nozzle.

8. The system of claim 4, wherein at least a portion of the branch flow path extends through the air nozzle.

9. The system of claim 4, wherein:
a portion of the branch flow path extends through the air nozzle in a first direction,
the injection port extends through the air nozzle in a second direction, and
the first direction is orthogonal to the second direction.

10. The system of claim 4, wherein:
at least a portion of the lateral ejection port is defined by the outer surface and by the nut; and
an output of the injection port is positioned farther downstream than an output of the lateral ejection port.

11. The system of claim 4, further comprising:
a liquid nozzle configured to output the urea solution into the gas flow path to generate the mixture;
wherein the double pipe structure comprises:
a first pipe configured to route the urea solution via the urea solution flow path; and
a second pipe configured to route pressurized air via the gas flow path; and
wherein the air nozzle is coupled to the second pipe via the nut.

12. The system of claim 11, wherein the liquid nozzle is directly coupled to the first pipe.

13. The system of claim 11, wherein an output of the liquid nozzle is aligned with an input opening of the injection port, and wherein the liquid nozzle is configured to output the urea solution such that at least a portion of the urea solution output by the liquid nozzle is received by the injection port via the input opening.

14. A urea solution spray device comprising:
a first pipe configured to route a urea solution via a urea solution flow path; and
a second pipe configured to route pressurized air via a gas flow path;
an air nozzle comprising:
a first port having a channel extending through the air nozzle, the first port configured to:
receive the urea solution and pressurized air, and
output, via the channel, a mixture of a first portion of the pressurized air and the urea solution from the air nozzle; and
an outer surface; and
a second port configured to eject a second portion of the pressurized air from the air nozzle; and
a nut configured to couple the air nozzle to the second pipe.

15. The urea solution spray device of claim 14, further comprising:
a double pipe structure comprising the first pipe and the second pipe, and
wherein:
the first pipe is positioned within the second pipe,
the urea solution flow path is defined by an interior surface of the first pipe, and
the gas flow path is defined by an outer surface of the first pipe and an inner surface of the second pipe.

16. The urea solution spray device of claim 14, wherein:
the second port extends through a portion of the air nozzle; and
an output of the injection port is positioned farther downstream than an output of the lateral ejection port.

17. The urea solution spray device of claim 14, wherein a third port is defined by the nut and the outer surface of the air nozzle, the third port coupled to the second port and configured to eject the second portion of the pressurized air along the outer surface of the air nozzle toward the first port.

18. The urea solution spray device of claim 17, further comprising:
a liquid nozzle configured to output the urea solution into the channel of the first port to generate the mixture of the first portion of the pressurized air and the urea solution.

* * * * *